US00RE38181E

(19) United States
(12) Reissued Patent
Kadle et al.

(10) Patent Number: US RE38,181 E
(45) Date of Reissued Patent: Jul. 15, 2003

(54) DEHUMIDIFYING MECHANISM FOR AUTO AIR CONDITIONER WITH IMPROVED SPACE UTILIZATION AND THERMAL EFFICIENCY

(75) Inventors: Prasad Shripad Kadle, East Amherst, NY (US); Mohinder Singh Bhatti, Amherst, NY (US)

(73) Assignee: Delphi Technologies, Inc., Troy, MI (US)

(21) Appl. No.: 09/792,199

(22) Filed: Feb. 23, 2001

Related U.S. Patent Documents

Reissue of:
(64) Patent No.: 5,878,590
Issued: Mar. 9, 1999
Appl. No.: 09/030,291
Filed: Feb. 25, 1998

(51) Int. Cl.[7] ..... F25D 23/00
(52) U.S. Cl. ..... 62/271; 165/165; 165/DIG. 357; 95/113; 96/125
(58) Field of Search ..... 62/94, 271; 165/165, 165/166, 8, DIG. 357, 358; 95/107, 111, 113; 96/125, 150

(56) References Cited

U.S. PATENT DOCUMENTS

| | | | | |
|---|---|---|---|---|
| 3,255,818 | A | 6/1966 | Beam, Jr. et al. | 165/166 |
| 3,424,240 | A | 1/1969 | Stein et al. | 165/DIG. 357 |
| 3,818,984 | A | 6/1974 | Nakamura et al. | 165/166 |
| 4,098,330 | A | 7/1978 | Flower et al. | 165/166 |
| 4,574,872 | A | 3/1986 | Yano et al. | 165/8 |
| 5,081,834 | A | 1/1992 | Darragh | 60/39.511 |
| 5,431,716 | A | 7/1995 | Ebbeson | 96/125 |
| 5,509,275 | A | 4/1996 | Bhatti et al. | 62/271 |

*Primary Examiner*—William C. Doerrler
*Assistant Examiner*—Mark Shulman
(74) *Attorney, Agent, or Firm*—Patrick M. Griffin

(57) ABSTRACT

An improved dehumidification system for automotive use includes a rotating, wheel like heat exchanger with axially open cells that carry a water adsorbing material. Opposed ambient air and heated air flows, covering opposite halves of the wheel, continually adsorb water on one side and are recharged on the other side. Alternating radially closed cells between the axially open cells carry no desiccant material, but receive a cross cooling flow, on the water adsorbing side of the wheel only, to remove the heat released during the water adsorption process. The desiccant recharging process on the other side of the wheel is not disturbed by the cross cooling flow.

10 Claims, 4 Drawing Sheets

DEHUMIDIFYING MECHANISM FOR AUTO AIR CONDITIONER WITH IMPROVED SPACE UTILIZATION AND THERMAL EFFICIENCY

Matter enclosed in heavy brackets [ ] appears in the original patent but forms no part of this reissue specification; matter printed in italics indicates the additions made by reissue.

TECHNICAL FIELD

This invention relates to vehicle dehumidifying mechanisms in general, and specifically to such a system with an improved thermal and air flow efficiency.

BACKGROUND OF THE INVENTION

U.S. Pat. No. 5,509,275 issued Apr. 23, 1996 to Bhatti, et al., and co-assigned to the assignee of the subject invention, discloses a system for continually dehumidifying ambient air that is drawn into a heating, ventilating and air conditioning (HVAC) system of a motor vehicle. Typically, hot air which is also quite humid is simply pulled directly in and forced over a cold evaporator core, which cools the air as well as condensing water out of the air. While drier air enters the passenger cabin, relying upon condensation by the evaporator core brings its own problems, especially microbial growth and its attendant odor. The patent noted provides a desiccant wheel of novel design that continually turns, at slow speed, within the HVAC housing, removing moisture in desiccant lined tubes in an adsorption half of the wheel, which are regenerated in a heated half of the wheel through which hot air is forced. The two "halves" of the wheel are defined by stationary rubbing seals. The tubes run axially from face to face of the wheel, but are not tightly packed, leaving space between for a radial cross flow of outside air that is blown over the outside of the tubes, in both halves of the wheel. The radial cross flow cools the tubes in the adsorption half of the wheel, removing the latent heat released by the desiccant when it adsorbs moisture. The cooling of the tubes in the adsorption half of the wheel is beneficial, since the heat released by the working desiccant is thereby prevented from reaching the evaporator core.

However, the same cross flow, when it crosses the other half of the wheel, is cooler than the heated air simultaneously passing through the inside of the tubes to regenerate the desiccant. Therefore, the cross flow air can potentially reduce the efficiency of the concurrent regeneration process as it passes through the other half of the wheel. In addition, much of the limited volume of the wheel is the empty space necessarily left between the tubes. Since space is at a premium in any HVAC housing, more complete utilization of the volume within the wheel would be desirable.

SUMMARY OF THE INVENTION

The subject invention discloses a more space efficient desiccant wheel that provides maximum utilization of the space within the wheel, combined with a novel system of ducts and seals that confines the radial cross cooling flow only to that half of the wheel where it is most beneficial.

In the preferred embodiment disclosed, the entire internal volume of the wheel, defined between a pair of axially spaced, annular end faces and a concentric outer cylindrical wall and central inner tunnel, is occupied by a closely packed array of evenly circumferentially spaced cells. Each cell is comprised of a pair of solid conductive metal leaves, separated by a constant thickness in a spiral pattern radiating from the central tunnel to the outer wall. A first set of cells, including every other cell contains a constant thickness, corrugated conductive metal fin, with axially oriented corrugations that run the entire axial length of the cell, from end face to end face. The cells in the first set are also axially open at each end face, but radially blocked throughout, because of the orientation of the fin corrugations. Therefore, in the first set of cells there is a potential axial flow path through, but not radial. A second set of cells, including those cells intermediate the first set, contains similar fins, with the same thickness and orientation, but with the axial end of each fin cut off at an angle to provide diagonally and radially opposed openings through the outer wall and central inner tunnel. Each cell of the second set of cells is deliberately blocked at both annular end faces, however. Therefore, in the second set of cells, there is a potential radial flow path from outer wall to inner tunnel (a compound radial and axial flow path), but no axial flow path from end face to end face. The fins in the first set of cells are desiccant coated, while those in the second set of cells are not, and all fins are tightly engaged with the leaves separating the individual cells, so as to provide efficient heat conductive paths through the adjacent cells that are otherwise sealed from one another in terms of potential air flow. In effect, all possible space within the wheel is taken up by cell spaces and their contained fins.

Within the HVAC system and housing, a novel system of ducts and seals directs various air flows through selected cells with maximum thermal efficiency, taking best advantage of the improved space efficiency of the wheel itself. Stationary rubbing seals against the faces of the wheel divide the wheel space enveloped into two basic halves that are also stationary, an adsorption half and a regeneration half, as with the previously patented design noted above. As the wheel slowly turns, cells from each set of cells turn through each half of the space successively and repeatedly. Humid outside air is directed through an outside air feed duct at a front end face of the wheel within the adsorption half of the divided space envelope. Since cells in the second set are axially blocked, humid air flows axially through only cells in the first set, passing axially over their desiccant coated fins. Moisture is adsorbed, and the latent heat released is conducted by the same fins across shared leaves and into adjacent cells in the second set.

Concurrently, outside air (or air at a similar ambient temperature) is fed radially through a feed manifold to the outer wall of the wheel, within the adsorption half of the envelope, and radially enters only cells from the second set (since cells in the first set are radially blocked). The cross flow of air flows radially through and axially across the fins of those cells of the second set of cells located within the adsorption half of the envelope, removing the released heat of adsorption conducted from adjacent cells. Because of the design of the wheel, all available volume within the adsorption half of the envelope is occupied either by cells involved in moisture adsorption, or cells involved in heat removal, with no dead or wasted space. Cross flow air in the adsorption half of the envelope eventually exits its cells into the central tunnel, which is axially blocked by a cap at the front end face. A semi-cylindrical, stationary rubbing seal blocks those radial openings in the central tunnel located in the regeneration half of the envelope. The capped tunnel and the semi-cylindrical seal together create a radial cross flow exhaust duct that directs the cross flow axially out and away from the wheel at the back face, preventing it from radially entering those cells of the second set located in the regeneration half of the envelope.

Also, concurrently, externally heated air is directed through a regeneration duct to the back end face of the wheel on the regeneration half of the space envelope, flowing axially only through those cells of the first set located in the regeneration half (since, again, cells of the second set are axially blocked). The heated air dries and regenerates the desiccant in the cells of the first set, without being cooled by any cross flow air in adjacent cells of the second set, improving the efficiency of operation. Regeneration air with moisture driven out of the desiccant is then axially exhausted away from the front face of the wheel. In addition, in the embodiment disclosed, the radial cross flow air that is exhausted from the central tunnel at the back face of the envelope tunnel is captured and used as pre heated entry air for the regeneration duct and its heater, so that the removed heat of adsorption is not wasted.

BRIEF DESCRIPTION OF THE DRAWINGS

These and other features of the invention will appear from the following written description, and from the drawings, in which.

DESCRIPTION OF THE PREFERRED EMBODIMENT

Figure 1:
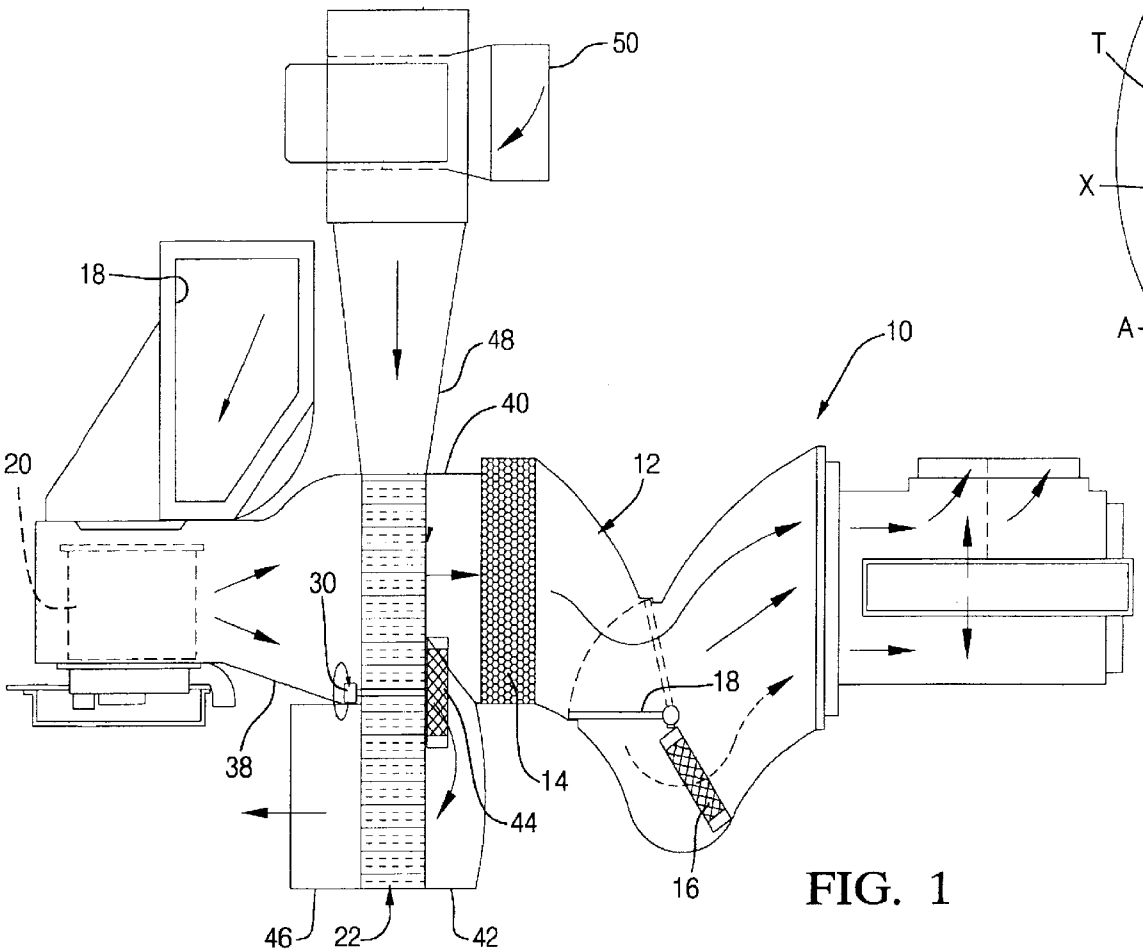
FIG. 1 is a schematic view of an HVAC system incorporating the desiccant wheel and associated duct work of the invention.

Referring first to FIG. 1, a vehicle heating, ventilation and air conditioning system, indicated generally at 10, includes several standard components and structures. A large hollow housing 12 contains a standard evaporator core 14 and heater core 16, through which a temperature door directs some, all, or none of the cooled air that has passed through evaporator core 14. Outside air at ambient temperature and humidity is forcibly drawn into housing 12 through inlet 18 by a standard main blower 20. Rather than being sent over the evaporator core 14 directly, as is standard, the ambient air is first dried by the dehumidifying system of the invention, which includes a wheel, indicated general at 22, and an associated series of ducts, seals and other components, described in detail later. The details of wheel 22 are described first.

Figure 2:
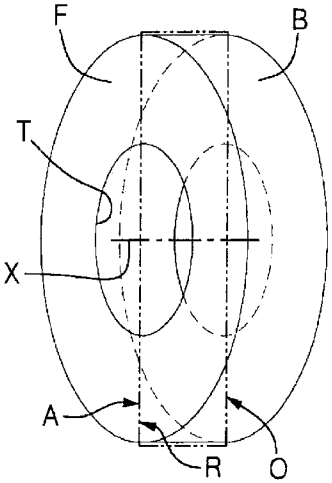
FIG. 2 is a schematic perspective of a space envelope occupied by the desiccant wheel of the invention, showing how it is divided into two basic halves.

Referring next to FIG. 2, wheel 22 is most easily conceptualized as having a central axis, shown by the dotted line X, and occupying a space envelope arrayed around axis X defined by a front annular end face F, a back annular end face B, an interior tunnel T, and a concentric outer cylindrical wall O. These represent imaginary boundaries, rather than structures, per se, but the wheel 22 can be considered to have equivalent structures, since it fits closely within the same envelope. The space envelope may also be conveniently conceptually divided into a first half or sub volume A, and a second one R, where water adsorption by, and regeneration of, the desiccant respectively take place. While the wheel 22 rotates, the divided space envelope is stationary, with any point on wheel 22 moving through the sub volumes A and R continually and in succession, as will appear below.

Figure 3:
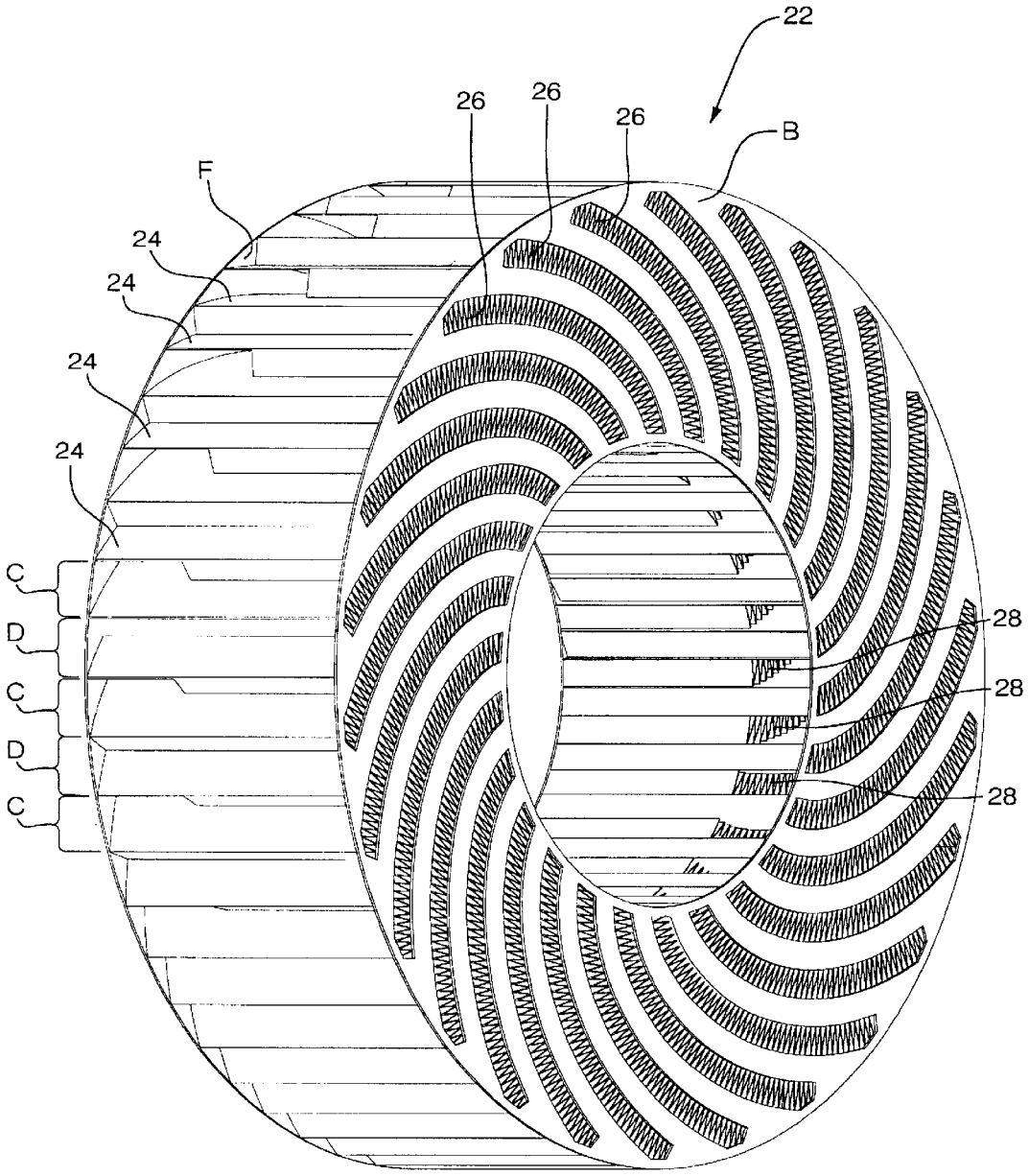
FIG. 3 is perspective view of the desiccant wheel alone.
Figure 4:
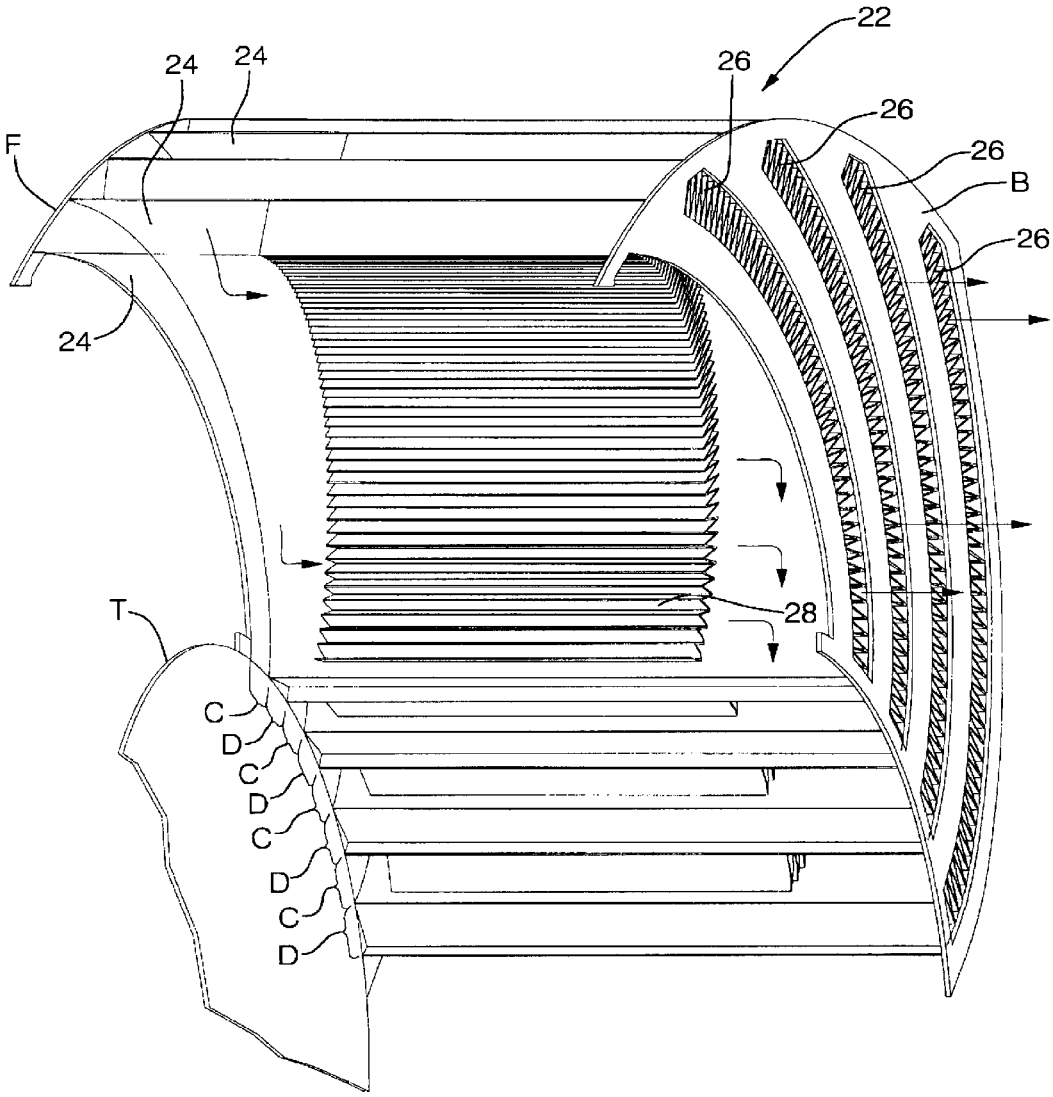
FIG. 4 is a perspective view of several individual cells of the wheel, showing the concurrent axial and radial air flows by arrows.

Referring next to FIGS. 2 through 4, the basic framework of wheel 22 is a series of generally rectangular solid leaves 24, of a suitable heat conductive material, most likely aluminum. The edges of the leaves 24 subtend the entire envelope, axially from F to B, and radially from T to O, but are not straight, like spokes of a wheel. Instead, they are folded over into a curve or spiral pattern so as to have a constant separation at any point, rather than a separation that radially diverges in a pie shape, as would spokes of a wheel. This is a known configuration, the advantage of which is that fins of a constant height can be contained between the leaves 24, which is a great manufacturing advantage. This regularly spaced arrangement of leaves 24 creates a series of regular subdivisions or cells, which are distinguished according to a type and shape of corrugated fin that they contain, and according to whether they are open or closed, axially and radially. Specifically, a first set of every other cell, indicated at D, contains a first type of corrugated fin 26, formed of a conductive material comparable to the leaves 24. Fin 26 has constant height corrugations, which are oriented axially and parallel to axis X, extending axially all the way from F to B, and radially all the way from T to O. The cells D of the first set are axially open at both faces F and B, so that air can flow over them parallel to axis X. The fins 26 are inherently radially blocked to flow, however, as are the cells D, because of the axial orientation of the corrugations. The peaks of the corrugations of fin 26 are closely engaged with, and preferably brazed to, the inner surfaces of the leaves 24 that border them. In addition, the surfaces of the corrugations of fins 26 are coated with a suitable desiccant material, such as zeolite, hence the designation D. Between each cell D is an intermediate cell C, distinguished by a different shaped fin 28 that it contains. Cells C of the second of cells house a fin 28 with corrugations of equal height and of the same conductive material, but bare of desiccant material, as it is intended only for heat conduction (hence the designation "C"). Each fin 28 extends radially from O to T, but deliberately not all the axially way from F to B. Instead, each axial end of each fin 28 is sliced off at an angle and both the front and back ends, as best seen in FIG. 4. This leaves a radial opening through O near the back end face B, and a diagonally opposed radial opening through T near the front end face F, in each cell C. While they are radially open, the cells C are deliberately axially blocked at both end faces F and B, preventing any straight through axial flow that could otherwise occur. The fins 28 are also closely engaged between adjacent leaves 24, preferably brazed thereto. Brazing of all the fins 26 and 28 between the leaves 24 would create a solid core assembly, just as in a typical plate type heat exchanger. In addition, as disclosed, the tunnel T is capped or blocked at the front face F, for a purpose described below. The radial perimeters of the wheel 22 at the radial limits 0 and T will be inherently "rough" or jagged, more so as the cells are fewer and thicker, and less so as they are increased in number and made thinner. If desired, an additional cylindrical sleeve could be added at both O and T, covering the otherwise jagged perimeter and providing a smoother potential sealing surface on the turning wheel 22, so long as they did not block the inner and outer radial openings into and out of the cells C. In conclusion, it will be noted that essentially every bit of the space envelope as defined is occupied by cells and their associated fins, with no "dead" or unoccupied space.

Figure 5:
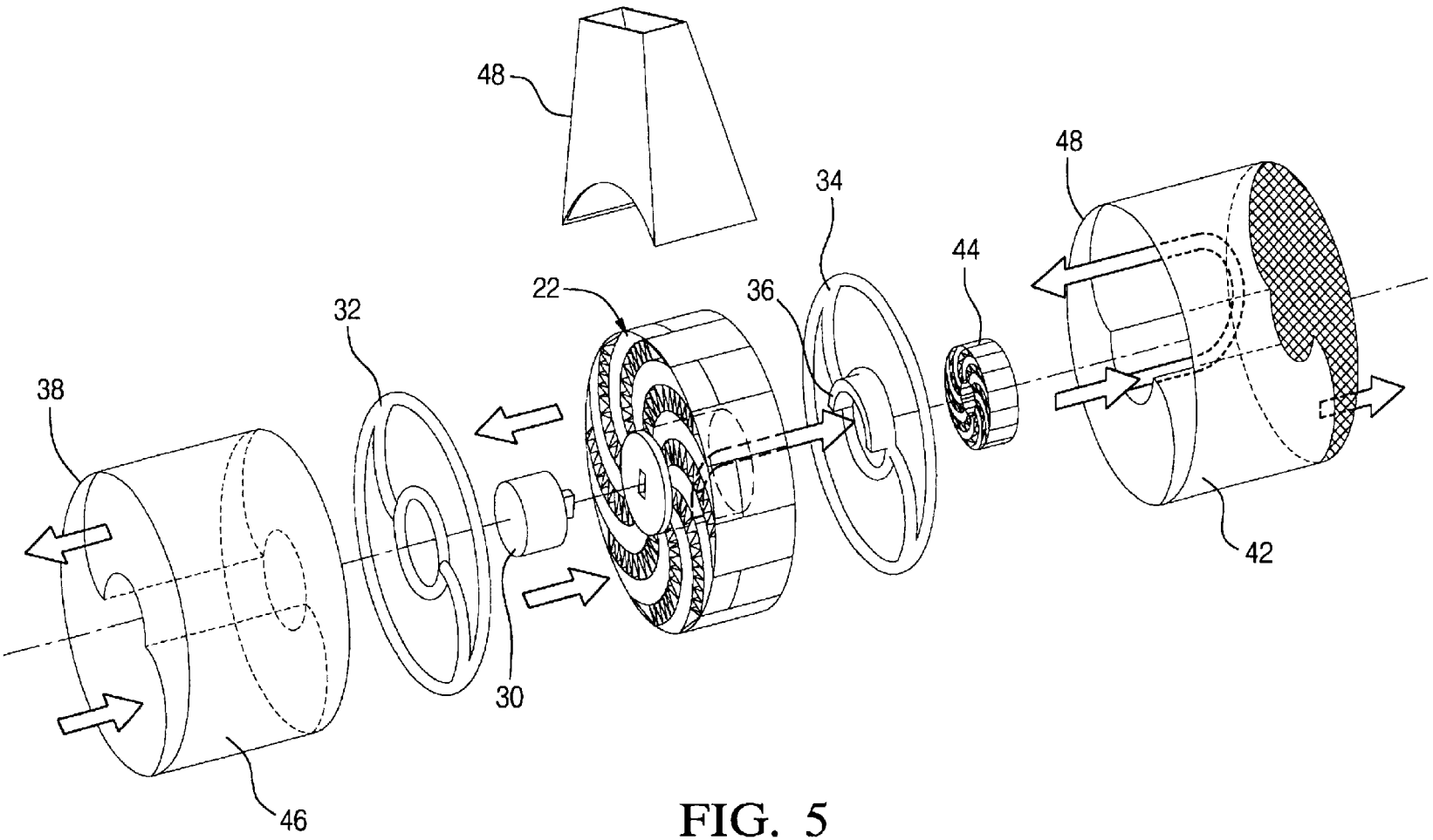
FIG. 5 is an exploded perspective view of the wheel and its associated ducts and seals, also showing the concurrent air flows by arrows.

Referring next to FIGS. 1, 4 and 5, wheel 22 is located within HVAC housing 12, upstream of evaporator core 14, and associated with a system of ducts, seals, and other components designed to concurrently send various air flows into and out of the cells D and C, depending upon their position within the space envelope subdivisions A and R. A motor 30 turns wheel 22 slowly so that the cells D and C continually move successively through the volumes A and R, at a slow rate of approximately one RPM. The demarcation of the sub volumes A and R is created by a front rubbing seal 32 that bears against the wheel front end face F, and a matching rear rubbing seal 34 that bears against the back end face B. Each seal 32 and 34 has concentric, circular inner and outer perimeters that match the diameters of the wheel outer wall O and inner tunnel T, and which are joined by diametrically opposed cross members, which divide the seals into two halves, in effect, and which thereby serve to direct and confine various air flows into and out of selected ones of the sub volumes A and R as defined above. In addition, the rear rubbing seal 34 includes a semi-cylindrical half sleeve 36 that extends axially inwardly into the wheel central tunnel T, within the sub volume R only, and just far enough to cover and block the radially inner openings into the tunnel T created by the sliced off back end of the fins 28. Each seal 32 and 34 is fixed to ducts that are stationary to and integral to the housing 12. Specifically, half of the front rubbing seal 32 is fixed to an outside air feed duct 38, integral to housing 12, bearing against the wheel front face F. A rear duct 40 matching the air feed duct 38, also integral to housing 12, mounts half of the rear rubbing seal 34 so as to bear closely against wheel back face B. The other half of the rear rubbing seal 34 is fixed to a regeneration air duct 42, side by side and integral with duct 40, and held closely against the wheel back face B. In the embodiment disclosed, the regeneration air duct 42 covers the uncapped end of the wheel's central tunnel T, where it also mounts a cylindrical regeneration heater 44 concentric to and just outside of the open end of tunnel T. A regeneration air exhaust duct 46, side by side and integral with outside air duct 38, mounts the other half of front rubbing seal 32 close against the wheel front face F. A stationary cross flow feed manifold 48 sealingly engage that half of the wheel outer wall O that is located within the sub volume A. An auxiliary blower 50 forces outside air (or air from some other source, such as the vehicle interior, that is at ambient or lower temperature) into the cross flow manifold 48. These various ducts and seals cooperate with wheel 22 in a fashion described in detail next.

Still referring to FIGS. 1, 4 and 5, whenever the air conditioning compressor is activated and the evaporator core 14 is cold, a suitable control system and sensors would determine when the ambient temperature and humidity were sufficient to require dehumidification. Motor 30 begins to turn, auxiliary blower 50 comes on, and regeneration heater 44 is activated. Most likely, regeneration heater 44, like standard heater core 16, would simply be fed by engine coolant, and always active, since its presence is irrelevant unless air is directed through it, which does not occur unless auxiliary blower 50 is on. The combination of an active blower 50 and motor 30 establishes several independent and concurrent air flows, which eventually reach an equilibrium. Each flow will be described separately, but their concurrence should be kept in mind. Outside air drawn in by the main blower 20 is forced against the wheel front face F, and, being axially blocked from the tunnel T (which is capped at F) and from the cells C, as well as blocked by the front rubbing seal 32 from the cells D that are located in the sub volume R, can pass axially through only those cells D located in the sub volume A, the "adsorption half" of wheel 22. About half of the cells D and C are located within the sub volumes A and R at any point in time. The outside air passes over the desiccant coating the fins 26, which adsorbs water from it, forming a complex molecule and releasing heat, known as the latent heat of vaporization. Just as it takes a good deal of energy to evaporate water into the air initially, a comparable amount of energy is released as heat when it is adsorbed, approximately 972 BTU/lb. This latent heat released within the desiccant coating raises the temperature of the underlying fin 26, conducting heat to the adjacent leaves 24 and into the fins 28 of the adjacent cells C. Concurrently, a cross flow outside air at ambient temperature (or comparably cool air from another source) is being forced by blower 50 through manifold 48 and radially into only those cells C located within the sub volume A. The cross flow air moves axially across and radially inwardly through the fins 28 in the adjacent cells C, picking up most of the released latent heat conducted into them. Therefore, the outside air exiting into the rear duct 40 and reaching the evaporator core 14 is drier, but not nearly as heated as it would have been without the cooling cross flow through the cells C. The evaporator core 14 is thus kept dry, but not forced to take on all the released latent heat that it otherwise would. The cross flow of air heated with those cells C located in the sub volume A is not simply exhausted back to ambient, in the embodiment disclosed. Instead, cross flow air enters the tunnel T through the openings provided by the cut away fins 28, where it is axially blocked at the wheel front face F (and thereby prevented from leaking back into the outside air duct 38). Heated cross flow air entering the tunnel T is also radially blocked by the half sleeve 36 from entering those cells C located in the sub volume R, it is therefore forced to flow axially out of tunnel T through the back face B and through the regeneration heater 44. Heater 44 raises the air flow further to a temperature of approximately 170 to 180 degrees Fahrenheit, after which it enters regeneration duct 42 and is forced to loop around and back against the wheel back face B. The heated air in duct 42 is kept within only the sub volume R by the rear rubbing seal 34 and, being unable to re enter the axially blocked cells C, flows axially through only those cells D located within the sub volume R. Within the sub volume R, the desiccant on the fins 26 contain the water adsorbed from their previous trip through the sub volume A. That water is desorbed and driven out by the air heated by heater 44, regenerating the desiccant, and exhausted from the wheel front face F through the exhaust duct 46 and back to the outside. Again, within the sub volume R, here is no cross cooling flow through the cells C to cool off the adjacent cells D and impact the efficiency of the desiccant regeneration process, because of the blockage provided by half sleeve 36.

In conclusion, maximum use is made of the available space within the wheel 22, while the various air flows are directed by the ducts and seals to those parts of the wheel 22 where they are most effective, and blocked from those parts of the wheel 22 where they are potentially counter productive. Variations in both the structure of wheel 22 and the various ducts and seals could be made. The leaves 24 could be flat and radiate like spokes of a wheel, creating cells that were pie shaped, rather than constant in height. However, the fins to fit within pie shaped cells would be much more difficult to manufacture, not having constant height corrugations. The fins 26 and 28 within the two respective sets of cells D and C could be shaped differently, so long as they were axially open through the cells D (which cells are radially blocked), and radially open through the cells C (which cells are axially blocked). For example, the fins 28 within the cells C could maintain the axially oriented corrugations, but be louvered or otherwise relieved in the corrugation walls so as to allow a radial flow. If the fins in the cells C could be manufactured with corrugation walls that were radial, rather than axially oriented, they would provide a radial flow path, while inherently blocking axial flow through the cells C. It would be very difficult to get fins with radially oriented corrugations to conform to the curved shape of the cells C, however. As far as the ducts and seals disclosed, the outside air flow and the regenerating air flows could be directed at either face of the wheel 22, and could flow either in the same direction, or opposed directions, so long as the seals kept the two flows confined to the two respective sub volumes A and R as defined. The cross flow cooling air exiting those cells C located within the sub volume A could flow in either radial direction, although it is clearly easier to direct it radially inwardly through the outer wall O and then exhaust it out of the tunnel T, rather than vice versa. The cross flow cooling air running through the cells C could simply be exhausted to the outside without being raised in temperature and then looped around back into the regeneration duct 42. However, using the exhausted heated cross flow air from the cells C located within the sub volume A as pre heated air for the regeneration half of the wheel 22 is desirable for overall thermal efficiency. A regeneration air exhaust duct like 46 is not absolutely necessary, as the regeneration air exiting the cells D located within the sub volume R would be exhausted from the wheel 22, anyway. Therefore, it will be understood that it is not intended to limit the invention to just the embodiment disclosed.

It is claimed:

1. For use in a vehicle heating and air conditioning system in which outside air at ambient humidity and temperature is forcibly drawn in and blown over an evaporator core, a system for dehumidifying and cooling the outside air before it reaches said evaporator core, comprising:

a generally cylindrical wheel having a central axis and bounded by an envelope having an inner cylindrical tunnel centered on said axis, a concentric outer cylindrical wall, and axially spaced, annular end faces, said wheel having a basic structural framework comprised of a plurality of regularly circumferentially spaced, solid, heat conductive leaves that are axially and radially coextensive with said envelope to define a plurality of individual cells, with a first set including every other one of said cells which are axially open at both annular faces, but radially blocked at both inner and outer cylindrical walls, and with a second set including those cells located between the cells of said first set and which are axially blocked at both annular faces, but radially open at both inner and outer cylindrical walls;

desiccant coated, heat conductive, axially open first fins closely engaged between the leaves of each of said first set of cells;

non-desiccant coated, heat conductive, radially open second fins closely engaged between the leaves of said second set of cells;

means for rotating said wheel about said central axis;

an outside air feed duct through which outside air at ambient temperature to be dehumidified is axially forced, said outside air feed duct being sealingly engaged with one annular face of said rotating wheel so as to be axially open only to those cells of said first set of cells that are, at any point time, located in a first sub volume of said envelope constituting approximately half the volume thereof, so that outside air flows through those cells and is dried by said desiccant coated first fins, which first fins then conduct the released latent heat of adsorption through said leaves to adjacent cells of said second set of cells;

a regeneration air duct through which heated air at substantially higher than ambient temperature is axially forced, said regeneration air feed duct being sealingly engaged with one annular face of said rotating wheel so as to be axially open only to those cells of said first set of cells that are, at any point time, located in a second sub volume of said envelope constituting the remaining approximately half volume thereof, so that the desiccant in those cells is regenerated by said heated air before they rotate back into said first sub volume;

a cross flow feed manifold sealingly engaged with the outer cylindrical wall of said envelope within said first sub volume only, through which ambient temperature air is forced radially into those cells of said second set of cells located in said first sub volume only, thereby removing the released latent heat of adsorption, through said second fins, and through the leaves shared with said adjacent first cells located in said first sub volume; and, a cross flow exhaust duct sealingly engaged with said wheel tunnel so as to be radially open to the those cells of the second set of cells that are located in said first sub volume but radially blocked from those cells of the second set of cells that are located in said second sub volume as well as axially blocked from the first set of cells in said first sub volume, said exhaust duct also extending axially away from one end face of said wheel so that radial cross flow air and the removed latent heat of adsorption can be discharged from said wheel.

2. For use in a vehicle heating and air conditioning system in which outside air at ambient humidity and temperature is forcibly drawn in and blown over an evaporator core, a system for dehumidifying and cooling the outside air before it reaches said evaporator core, comprising:

a generally cylindrical wheel having a central axis and bounded by an envelope having an inner cylindrical tunnel centered on said axis, a concentric outer cylindrical wall, and axially spaced, annular end faces, said wheel having a basic structural framework comprised of a plurality of regularly circumferentially spaced, solid, heat conductive leaves that are axially and radially coextensive with said envelope to define a plurality of individual cells, with a first set including every other one of said cells which are axially open at both annular faces, but radially blocked at both inner and outer cylindrical walls, and with a second set including those cells located between the cells of said first set and which are axially blocked at both annular faces, but radially open at both inner and outer cylindrical walls;

desiccant coated, heat conductive, axially open first fins closely engaged between the leaves of each of said first set of cells;

non-desiccant coated, heat conductive, radially open second fins closely engaged between the leaves of said second set of cells;

means for rotating said wheel about said central axis;

an outside air feed duct through which outside air at ambient temperature to be dehumidified is axially forced, said outside air feed duct being sealingly engaged with one annular face of said rotating wheel so as to be axially open only to those cells of said first set of cells that are, at any point time, located in a first sub volume of said envelope constituting approximately half the volume thereof, so that outside air flows through those cells and is dried by said desiccant coated first fins, which first fins then conduct the released latent heat of adsorption through said leaves to adjacent cells of said second set of cells;

a cross flow feed manifold sealingly engaged with the outer cylindrical wall of said envelope within said first sub volume only, through which ambient temperature air is forced radially into those cells of said second set of cells located in said first sub volume only, thereby removing the released latent heat of adsorption, through said second fins, and through the leaves shared with said adjacent first cells located in said first sub volume;

a cross flow exhaust duct sealingly engaged with said wheel tunnel so as to be radially open to the those cells of the second set of cells that are located in said first sub volume but radially blocked from those cells of the second set of cells that are located in said second sub volume as well as axially blocked from the first set of cells in said first sub volume, said cross flow exhaust duct also extending axially away from one end face of said wheel so that radial cross flow air and the removed latent heat of adsorption can be discharged from said wheel;

a regeneration heater in said cross flow exhaust duct sufficient to raise the temperature of said discharged cross flow air substantially above ambient temperature; and, a regeneration air duct that receives said heated cross flow air and which is sealingly engaged with one annular face of said rotating wheel so as to be axially open only to those cells of said first set of cells that are, at any point time, located in a second sub volume of said envelope constituting the remaining approximately half volume thereof, so that the desiccant in those cells is regenerated by said heated air before they rotate back into said first sub volume.

3. For use in a vehicle heating and air conditioning system in which outside air at ambient humidity and temperature is forcibly drawn in and blown over an evaporator core, a system for dehumidifying and cooling the outside air before it reaches said evaporator core, comprising:

a generally cylindrical wheel having a central axis and bounded by an envelope having an inner cylindrical tunnel centered on said axis, a concentric outer cylindrical wall, and axially spaced, annular end faces, said wheel having a basic structural framework comprised of a plurality of regularly circumferentially spaced, solid, heat conductive leaves that are axially and radially coextensive with said envelope to define a plurality of individual cells, with a first set including every other one of said cells which are axially open at both annular faces, but radially blocked at both inner and outer cylindrical walls, and with a second set including those cells located between the cells of said first set and which are axially blocked at both annular faces, but radially open at both inner and outer cylindrical walls, said wheel inner further being axially blocked at said front face;

desiccant coated, heat conductive, axially open first fins closely engaged between the leaves of each of said first set of cells;

non-desiccant coated, heat conductive, radially open second fins closely engaged between the leaves of said second set of cells;

means for rotating said wheel about said central axis;

an outside air feed duct through which outside air at ambient temperature to be dehumidified is axially forced, said outside air feed duct being sealingly engaged with the front annular face of said rotating wheel so as to be axially open only to those cells of said first set of cells that are, at any point time, located in a first sub volume of said envelope constituting approximately half the volume thereof, so that outside air flows through those cells and is dried by said desiccant coated first fins, which first fins then conduct the released latent heat of adsorption through said leaves to adjacent cells of said second set of cells;

a cross flow feed manifold sealingly engaged with the outer cylindrical wall of said envelope within said first sub volume only, through which ambient temperature air is forced radially into those cells of said second set of cells located in said first sub volume only, thereby removing the released latent heat of adsorption, through said second fins, and through the leaves shared with said adjacent first cells located in said first sub volume;

a seal member within the wheel central tunnel radially blocking those cells of the second set located within said second sub volume, whereby cross flow air heated within said first sub volume and exiting into said central tunnel is axially forced out of said tunnel toward the back face of said wheel;

a regeneration heater mounted concentrically to said tunnel at said wheel back face, so that heated cross flow air from said central tunnel is discharged therethrough, said auxiliary heater being sufficient to raise the temperature of said discharged cross flow air substantially above ambient temperature; and, a regeneration air duct that receives said heated cross flow air and which is sealingly engaged with one annular face of said rotating wheel so as to be axially open only to those cells of said first set of cells that are, at any point in time, located in a second sub volume of said envelope constituting the remaining approximately half volume thereof, so that the desiccant in those cells is regenerated by said heated air before they rotate back into said first sub volume.

*4. A system, comprising:*

*a generally cylindrical wheel having a central axis and being bounded by an envelope having an inner cylindrical tunnel and a concentric outer cylindrical centered on said axis, said generally cylindrical wheel having axially spaced, annular end faces and a basic structural framework comprised of a plurality of regularly circumferentially spaced, solid, heat conductive leaves that are axially and radially coextensive with said envelope to define a plurality of individual cells, with a first set including every other one of said cells which are axially open at both annular faces, but radially blocked at both inner and outer cylindrical walls, and with a second set including those cells located between the cells of said first set and which are axially blocked at both annular faces, but radially open at both inner and outer cylindrical walls;*

*heat conductive, axially open first fins closely engaged between the leaves of each of said first set of cells; and,*

*heat conductive, radially open second fins closely engaged between the leaves of said second set of cells.*

*5. An apparatus for treating fluid, comprising:*

*a generally cylindrical wheel having a central axis and being bounded by an envelope having an inner cylindrical tunnel and a concentric outer cylindrical wall centered on said axis, said cylindrical wheel having axially spaced, annular end faces and a basic structural framework comprised of a plurality of regularly circumferentially spaced, solid, heat conductive leaves that are axially and radially coextensive with said envelope;*

*a first set of cells defined by said leaves and being axially open at both annular faces and radially blocked at both inner and outer cylindrical walls; and*

*a second set cells defined by said leaves and being axially blocked at both annular faces and radially open at both inner and outer cylindrical walls.*

*6. An apparatus for treating fluid, comprising:*

*a generally cylindrical wheel having a central axis, a concentric outer cylindrical wall, and axially spaced, annular end faces, said wheel having a basic structural framework comprised of a plurality of regularly circumferentially spaced, solid, heat conductive leaves that are axially and radially coextensive with said envelope, said conductive leaves being in a spiral shape with a generally constant distance between said conductive leaves;*

*a first set of cells defined by said leaves and being axially open at both annular faces and radially blocked at both inner and outer cylindrical walls; and*

*a second set cells defined by said leaves and being axially blocked at both annular faces and radially open at both inner and outer cylindrical walls.*

*7. A system for treating a first fluid flow, comprising:*

*a generally cylindrical wheel having a central axis and being bounded by an envelope having an inner cylindrical tunnel centered on said axis, a concentric outer cylindrical wall, and axially spaced, annular end faces, said wheel having a basic structural framework comprised of a plurality of regularly circumferentially spaced, solid, heat conductive leaves that are axially and radially coextensive with said envelope to define a plurality of individual cells, with a first set including every other one of said cells which are axially open at both annular faces, but radially blocked at both inner and outer cylindrical walls, and with a second set including those cells located between the cells of said first set and which are axially blocked at both annular faces, but radially open at both inner and outer cylindrical walls;*

*heat conductive, axially open first fins closely engaged between the leaves of each of said first set of cells;*

*heat conductive, radially open second fins closely engaged between the leaves of said second set of cells;*

*means for rotating said wheel about said central axis;*

*an outside feed duct through which said first fluid flow is axially forced, said outside air feed duct being sealingly engaged with one annular face of said rotating wheel so as to be axially open only to those cells of said first set of cells that are, at any point time, located in a first sub volume of said envelope constituting approximately half the volume thereof, so that outside air flows through those cells and is treated by said coated first fins;*

*a cross flow feed manifold sealingly engaged with the outer cylindrical wall of said envelope within said first sub volume only, through which a second fluid flow is forced radially into those cells of said second set of cells located in said first sub volume only, thereby removing the released latent heat of adsorption, through said second fins, and through the leaves shared with said adjacent first cells located in said first sub volume; and,*

*a cross flow exhaust duct sealingly engaged with said wheel tunnel so as to be radially open to the those cells of the second set of cells that are located in said first sub volume but radially blocked from those cells of the second set of cells that are located in said second sub volume as well as axially blocked from the first set of cells in said first sub volume, said exhaust duct also extending axially away from one end face of said wheel so that said second fluid flow can be discharged from said wheel.*

*8. A system, comprising:*

*a generally cylindrical wheel having a central axis and being bounded by an envelope having an inner cylindrical tunnel and a concentric outer cylindrical centered on said axis, said generally cylindrical wheel having axially spaced, annular end faces and a basic structural framework comprised of a plurality of regularly circumferentially spaced, solid, heat conductive leaves that are axially and radially coextensive with said envelope to define a plurality of individual cells, with a first set including every other one of said cells which are axially open at both annular faces, but radially blocked at both inner and outer cylindrical walls, and with a second set including those cells located between the cells of said first set and which are axially blocked at both annular faces, but radially open at both inner and outer cylindrical walls;*

*heat conductive, axially open first fins closely engaged between the leaves of each of said first set of cells; and,*

*heat conductive, radially open second fins closely engaged between the leaves of said second set of cells, wherein at least one of said first and second fins have corrugations of substantially equal height.*

*9. An apparatus for treating fluid, comprising:*

*a generally cylindrical wheel having a central axis and being bounded by an envelope having an inner cylindrical tunnel and a concentric outer cylindrical wall centered on said axis, said cylindrical wheel having axially spaced, annular end faces and a basic structural framework comprised of a plurality of regularly circumferentially spaced, solid, heat conductive leaves that are axially and radially coextensive with said envelope;*

*a first set of cells defined by said leaves and being axially open at both annular faces and radially blocked at both inner and outer cylindrical walls;*

*a second set cells defined by said leaves and being axially blocked at both annular faces and radially open at both inner and outer cylindrical walls;*

*heat conductive, fins closely engaged between the leaves of at least one of said first and second set of cells, wherein said fins have corrugations of substantially equal height.*

*10. A method for exchanging thermal energy between first and second fluid flows, comprising:*

*axially forcing said first fluid flow through a first set of cells in a wheel, said wheel having a central axis and being bounded by an envelope having an inner cylindrical tunnel and a concentric outer cylindrical wall centered on said axis, said cylindrical wheel having axially spaced, annular end faces and a basic structural framework comprised of a plurality of regularly circumferentially spaced, solid, heat conductive leaves that are axially and radially coextensive with said envelope, said first set of cells being defined by said leaves and being axially open at both annular faces and radially blocked at both inner and outer cylindrical walls;*

*radially forcing said second fluid flow through a second set of cells, said second set cells being defined by said leaves and being axially blocked at both annular faces and radially open at both inner and outer cylindrical walls.*

* * * * *